US005138764A

United States Patent [19]
Breda et al.

[11] Patent Number: 5,138,764
[45] Date of Patent: Aug. 18, 1992

[54] METHOD FOR ASSEMBLING HEAT EXCHANGER PLATE PAIRS BY SNAP FIT

[75] Inventors: Michael A. Breda, East Amhert; George K. Snyder, Lockport, both of N.Y.

[73] Assignee: General Motors Corporation, Detroit, Mich.

[21] Appl. No.: 687,158

[22] Filed: Apr. 18, 1991

[51] Int. Cl.⁵ .............................................. B21D 53/02
[52] U.S. Cl. ........................... 29/890.039; 29/890.053; 29/726
[58] Field of Search ............... 29/890.039, 429, 726, 29/890.083, 453; 165/167

[56] References Cited

U.S. PATENT DOCUMENTS

| | | | |
|---|---|---|---|
| 4,592,414 | 6/1986 | Beasley | 29/890.039 |
| 4,846,268 | 7/1989 | Beldan | 29/890.039 |
| 4,860,421 | 8/1989 | Breda et al. | 29/157.3 |
| 4,900,328 | 2/1990 | Breda et al. | 29/890.039 |
| 4,901,414 | 2/1990 | Breda et al. | 29/890.04 |
| 4,915,163 | 4/1990 | Matsunaga et al. | 29/890.039 |

FOREIGN PATENT DOCUMENTS 0372402  3/1923  Fed. Rep. of Germany ........................ 29/890.039

Primary Examiner—Irene Cuda
Attorney, Agent, or Firm—Ronald L. Phillips

[57] ABSTRACT

A machine with counter-rotating rotors moves heat exchanger plates two at a time with vacuum assist through paths which converge in a vertical mating plane. Arcuate guides engage the plate ends to control the plate path. The rotors are servomotor controlled to synchronously index the rotor in increments separated by dwell periods. After assembly the merged pairs drop between spaced guides into an assembly fixture. At a subsequent brazing operation each plate pair becomes a tube for carrying refrigerant.

2 Claims, 5 Drawing Sheets

METHOD FOR ASSEMBLING HEAT EXCHANGER PLATE PAIRS BY SNAP FIT

FIELD OF THE INVENTION

This invention relates to assembly method and apparatus for mating pairs of plates for heat exchanger manufacture.

BACKGROUND OF THE INVENTION

Heat exchangers of the plate type are comprised of pairs of preformed plates joined to other pairs at their ends by integral bosses and separated at their middle section by air centers or corrugated fins, the plates and fins all being brazed together so that each pair of plates becomes a tube for carrying refrigerant, the bosses serving as a manifold for permitting refrigerant flow from one tube to another, and the fins facilitating heat exchange between the tubes and air flowing outside the tubes. U.S. Pat. No. 4,470,455 issued to Sacca describes such a plate type heat exchanger in detail. The assembly of the plate type heat exchanger elements into a core ready for brazing has typically been carried out largely by hand operations. Specifically, the first step is to assemble a fin element between two plates and crimp the plates together into subassemblies where their bosses connect, and then manually stack such subassemblies into a fixture which holds each subassembly in place. It is desirable to improve on the assembly practice by an improved method and machine for assembly. In particular it has been found that the process is improved in terms of automation and in terms of reducing spacing in the fixture if it is begun by joining the plates together before adding fins. Method and apparatus which has proven successful in assembling pairs of plates for assembly into a heat exchanger is disclosed in U.S. Pat. No. 4,900,328 issued to the inventors here. However, it was also found that improvements would be necessary to significantly increase the plate feed rate while also providing accurate plate positioning for inspection for proper parts and orientation.

SUMMARY OF THE INVENTION

It is therefore an object of the invention to provide an improved method and apparatus for assembling pairs of plates for assembly into a heat exchanger. The invention is carried out by the method of assembling pairs of elongated metal plates having side edges comprising the steps of: positioning two plates with vacuum assisted action in spaced relation on opposite sides of a mating plane with their proximal edges parallel, moving the plates simultaneously through respective arcs that are tangential to the mating plane with continuing vacuum assisted action so that the proximal edges touch at the mating plane, and continuing the movement of the plates with the proximal edges remaining in the mating plane until the distal edges touch.

The invention is further carried out by apparatus for assembling pairs of elongated heat exchanger plates comprising; a pair of counter-rotating rotors mounted to approximately meet at a merging zone in a vertical mating plane, a plurality of pockets in each rotor, each pocket being adapted to receive a plate, vacuum means for forcing the plates into the pockets and also holding them there in a precise position, means for driving the rotors in synchronism in a direction to carry plates toward the merging zone, means for guiding each plate in a path tangentially meeting the mating plane in the merging zone, and discharge means comprising means for advancing assembled pairs of plates from the merging zone in the mating plane.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE PREFERRED EMBODIMENT

Figure 1:
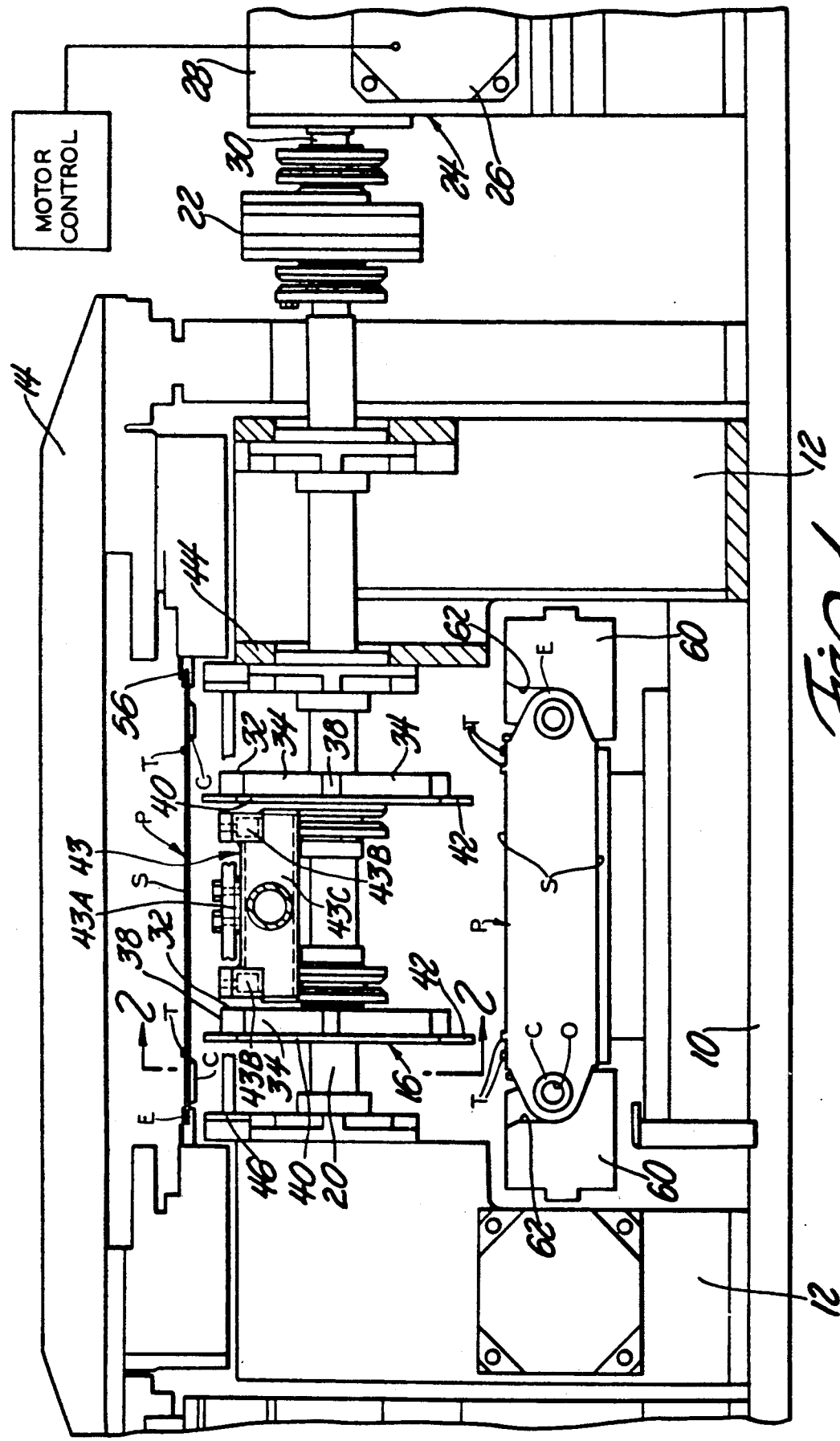
FIG. 1 is a front elevation of a plate assembly machine according to the invention.

The parts to be assembled by the subject method and apparatus are well known and are best shown in the above mentioned patent to Sacca 4,470,455 but are further shown here as part of FIG. 1. An elongated plate P has straight side edges S and tapered and rounded ends E. A boss or cup C near each end has a central opening O. One side of each plate has a tab T near each end. The objective is to mate two of these plates with the cups C outboard of the assembly and the tabs T of each plate adjacent a tab of the other plate to aid in maintaining proper alignment of the plates. The plate pairs, when brazed in a subsequent process, become tubes for carrying refrigerant and the interconnecting cups of the tubes become manifolds for conducting the refrigerant from tube to tube. The majority of the tubes in a heat exchanger are symmetrical and are composed of two identical standard plates. Some tubes, however, are special and require one special plate and one standard plate. A standard plate, as described, has an opening O for communicating with another plate. A special plate may have an inlet or outlet fitting in place of the standard opening or may have no opening O in one end for fluid flow management purposes. The assembly method is the same for standard and special plates. The desired combination of plates are loaded into the machine and are combined in the manner to be described.

Figure 2:
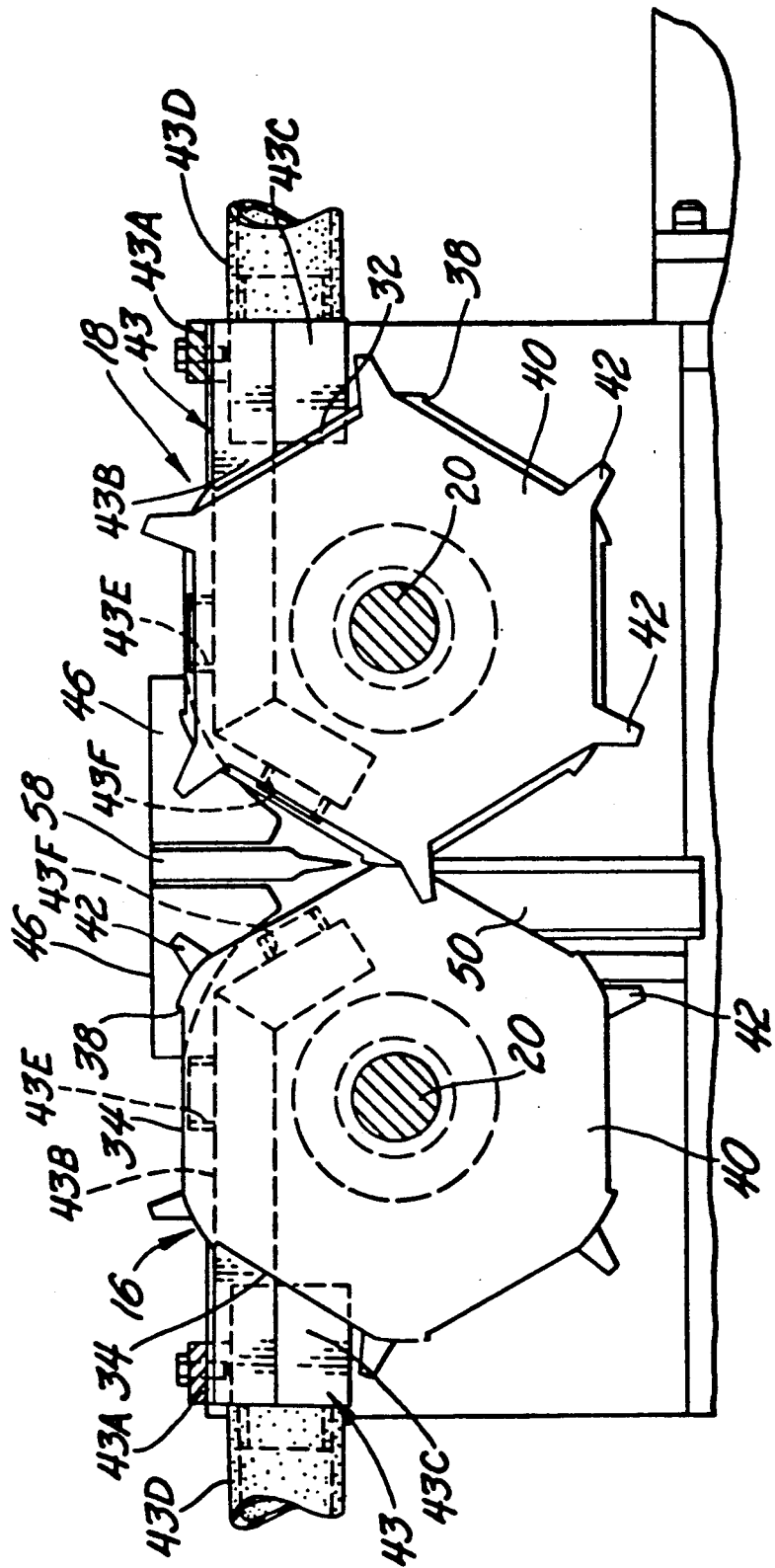
FIG. 2 is a sectional view of the machine taken along lines 2—2 of FIG. 1.

FIGS. 1 and 2 show a plate assembly machine having a base 10, support standards 12 and a sliding carriage 14. Rotors 16 and 18 each have a shaft 20 journaled in the standards 12. The shafts 20 are connected through a coupling 22 to a drive mechanism 24. The drive mechanism includes a servomotor 26 coupled to a gearbox 28 having two outputs 30 drivingly coupled to the shafts 20. A motor control 27 is connected to the motor to control its speed and position. For this embodiment the servomotor 26 is energized to repeatedly index the rotor 16 one sixth revolution or 60 degrees at a time with intervening dwell periods. In practice the motor is controlled so that the indexing period requires about 150 ms and the dwell period is 200 ms.

Each rotor 16 further includes a pair of spaced wheels 32 mounted on the shaft 20 for rotation therewith, the wheels having a diameter substantially equal to the shaft 20 spacing so that the wheels on one shaft approximately meet the respective cooperating wheels on the other shaft. Six flats or pockets 34 on the periphery of each wheel 32 are provided to receive and carry plates P which are being assembled by the machine. A shoulder 38 at the leading edge (in the direction of wheel rotation) of each flat helps locate the plate in its proper position. A disk 40 secured to each wheel 32 has fingers 42 projecting radially beyond the wheel periphery, each finger being located at the trailing edge of a pocket 34 to serve as a part locator and as a driver to move the part through its path. The disks 40 are on the outside surface of one wheel 32 and on the inside surface of the cooperating wheel so that the disks are in separate planes and the fingers do not collide upon wheel rotation.

Figure 3:
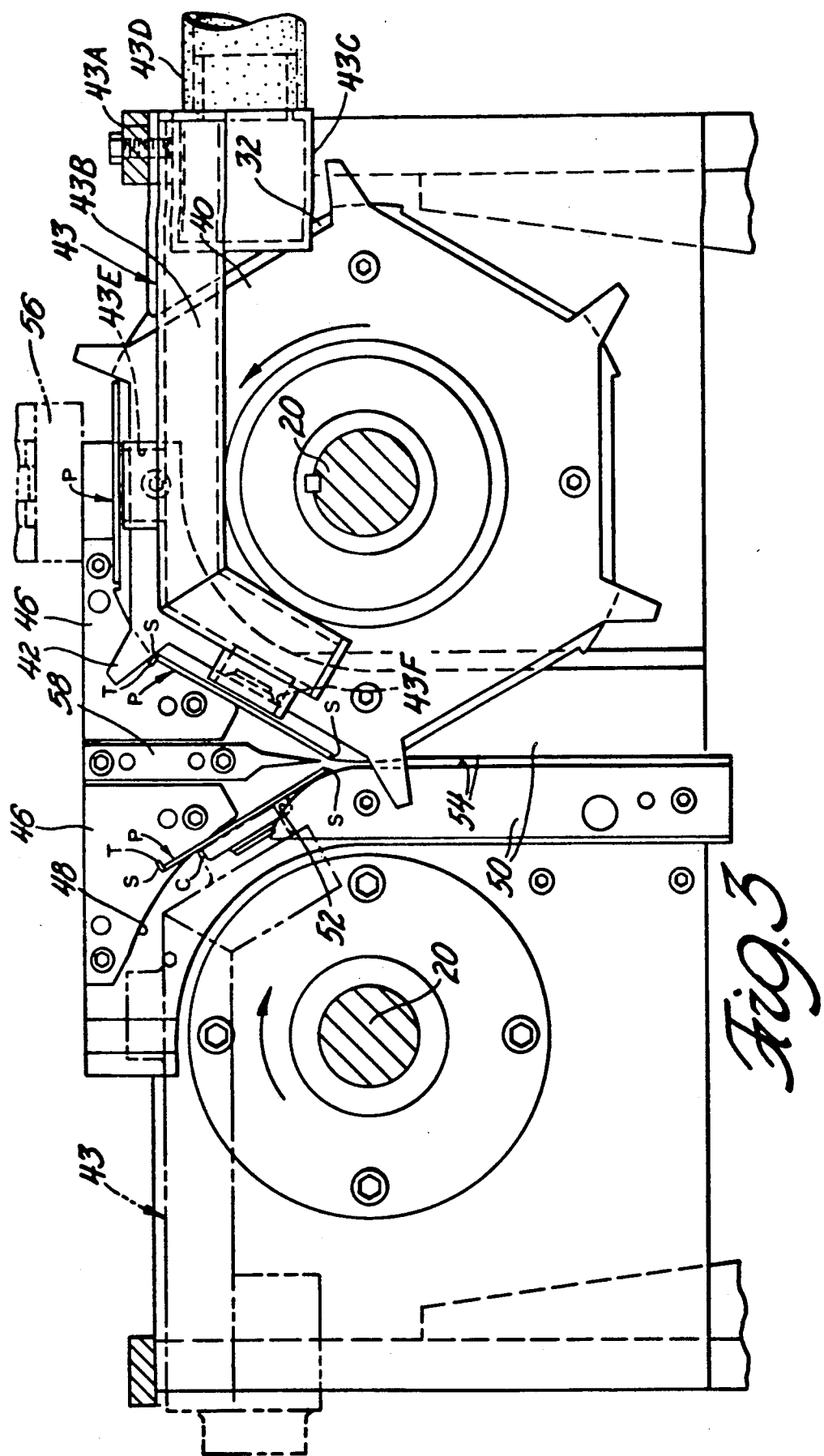
FIG. 3 is a sectional view of the machine taken along lines 2—2 of FIG. 1 with parts removed to reveal guide detail.
Figure 4:
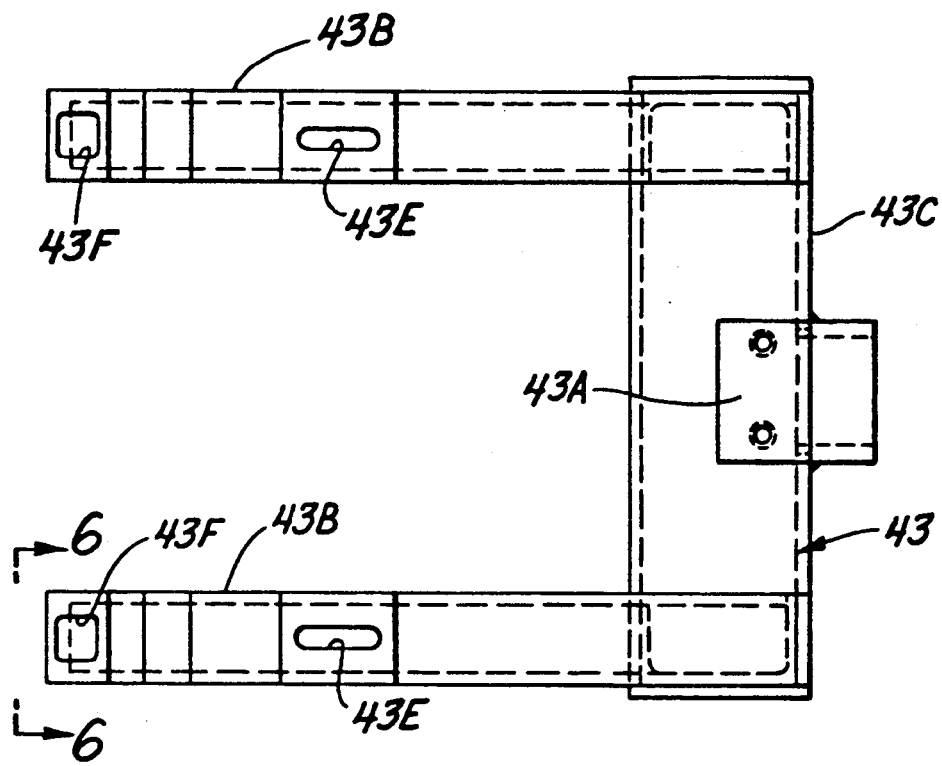
FIG. 4 is a plan view of one of the vacuum hands taken along lines 4—4 in FIG. 3.
Figures 5, 6:
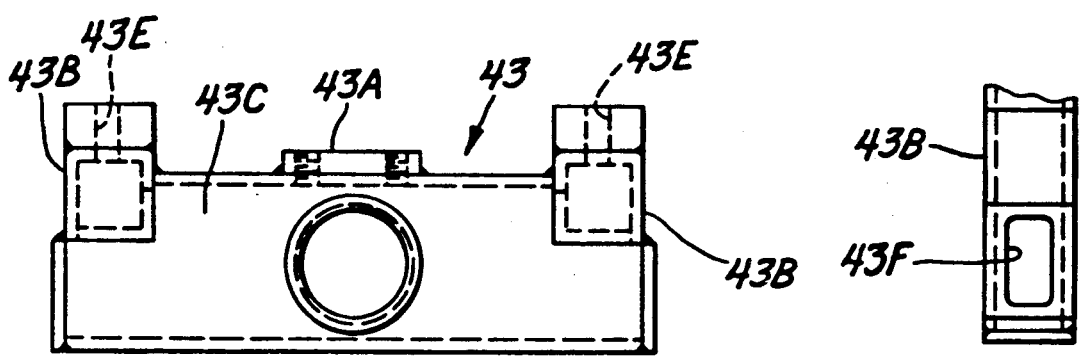
FIG. 5 is an end view of the vacuum hand in FIG. 4 taken along the lines 5—5 in the latter view.
FIG. 6 is an end view of the vacuum hand arms in FIG. 4 taken along the line 6—6 in the latter view.

A stationary vacuum assist hand 43 positioned between the feed wheels 32 on each rotor 16 and beneath the rotating pockets 34 is mounted by a bracket 43A on an upper section of the respective standard 12 as seen in FIGS. 1 and 3. The hands 43 have a pair of arms 43B made of rectangular tubing and a bridge 43C connecting the arms and bracket made of square tubing as seen in FIGS. 4-6. Each of the arms 43B extends adjacent one of the feed wheels 32 at opposite ends of the pockets and is angulated near its end to follow the wheel's contour as seen in FIG. 3. A vacuum hose 43D connected with a vacuum source (not shown) is attached to each hand 43 and vacuum ports 43E, 43F are located in two positions on each arm to provide for the vacuum to suck a tube plate into the feed wheel pockets 34 at the 12:00 o'clock position (43E) and to hold the plate therein through the 2:00 (10:00) o'clock position (43F). In the top position (12:00), the force of the vacuum at ports 43E is effective to allow increase of the index speed of the feed wheels and also hold the tube plate from bouncing out of position following its release from the magazine. In the 2:00 (10:00) o'clock or 60° (300°) positions, the applied vacuum at ports 43F provides drag and suction to keep the tube plates from slipping off of the feed wheels particularly when they rapidly index. Moreover, the vacuum assists in holding the tube plates in an accurate position to allow for inspection for proper part and orientation.

Side walls 44 inboard of the support standard 12 and outboard of the wheels 32 carry guides which are plates with contoured edges positioned to contact the ends E of the plate P to control the plate path during the wheel rotation. These are shown in FIG. 3 which has one wheel 32 omitted for clarity. The guides are identical for each end. At one end, an upper guide 46 for each wheel 32 has an arcuate edge 48 generally concentric with the respective shaft 20 and is positioned above the wheel to allow the upper surface of the plate end E to slide on the edge 48 during a portion of the wheel rotation. This assures that the plate P remains properly nested in the pocket 34 with the vacuum assist. A lower guide 50 for each wheel has a curved edge 52 facing outwardly from the shaft 20 and is positioned in the part path after the upper guide ends for engaging the lower surface of the plate end E to lift the plate P from the pocket 34 as the part paths are about to converge. The lower guide also has a straight vertical edge 54 extending down from the curved edge 52. Two adjacent lower guides 50 are slightly spaced to define a narrow channel along the mating plane for slidingly carrying a plate pair assembly from the machine. Finally, a center guide 58 centered on the mating plane comprises a narrow downwardly tapered plate between the curved edges 52 of the lower guide 50.

A parts loading mechanism is shown in FIG. 1. Two such loading stations are required, one above each rotor 16, 18. Identical plates may be supplied to both stations or different plates may be used to obtain a special tube. Outboard of and above each wheel 32 an escapement 56 on the carriage 14 selects the bottom plate P in a stack of plates (not shown) and drops it into the upper pocket 34 above the vacuum holes 43E when the rotor is in dwell position so that both rotors simultaneously receive plates. The escapement is commercially available equipment and forms no part of this invention. Discharging the assembled plate pairs from the machine comprises dropping them from the guides 50 after they pass the vacuum holes 43F as described. To receive the plate pairs and maintain them in assembled condition, a fixture comprising a plurality of assembly holding blocks 60 is indexed beneath the rotors to align a block in the mating plane to receive each dropped assembly. Each block 60 has a slot-like pocket 62 shaped to conform to an end E of a plate pair and is open at the top to permit entry into the pocket.

Figure 7:
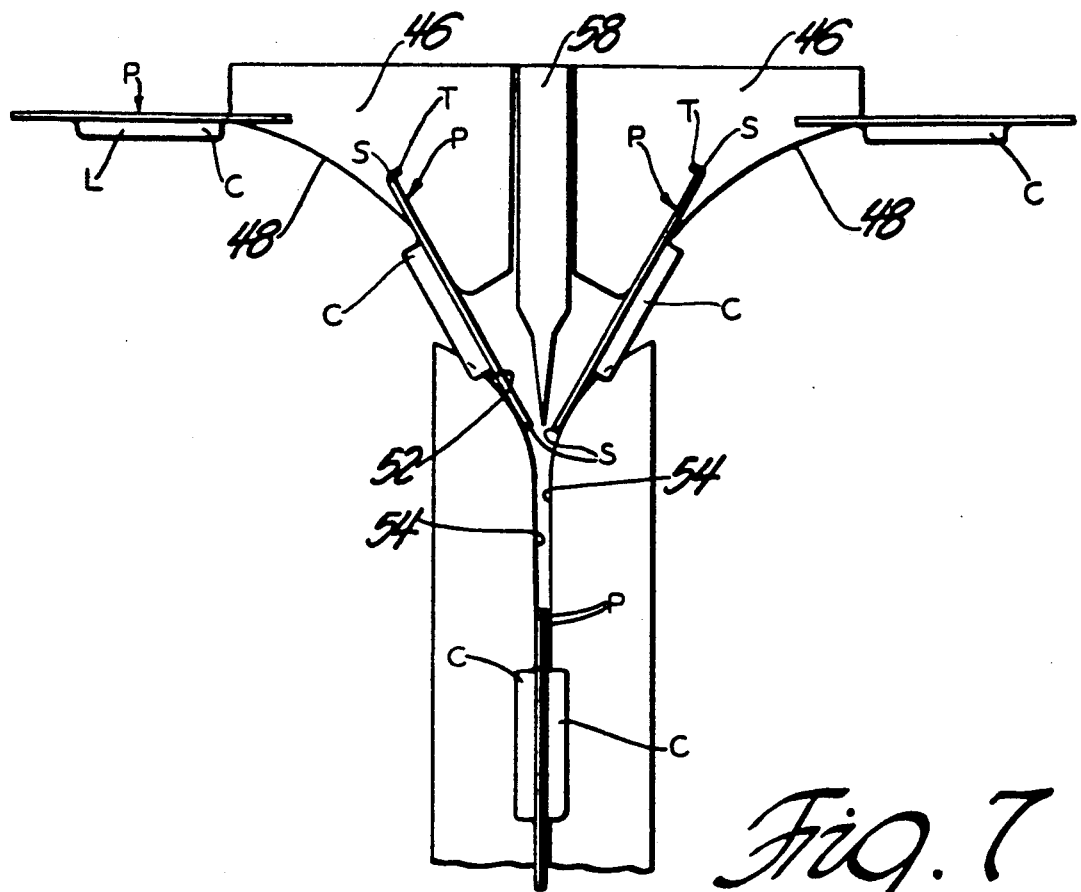
FIGS. 7 and 8 are schematic views illustrating various plate positions in the machine as the plates move along an assembly path
Figure 8:
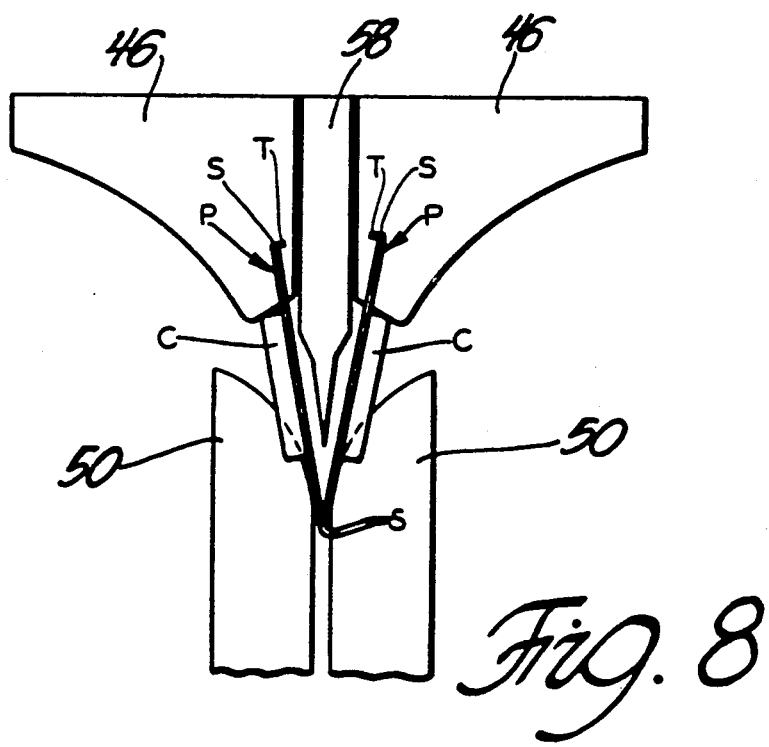

FIGS. 7 and 8 show the movement of the plates P along the guides. In FIG. 7 three plate positions are shown which correspond to the dwell wheel 32 position shown in FIGS. 2 and 3. In the upper, horizontal plate position the plates have just been loaded into the upper pockets and are being held therein by gravity and the vacuum assist. The plate ends E are able to pass by the end of the guide 46. As the wheels are indexed 60 degrees, the ends E slide along the guide surface 48 and are thus positively prevented from ejection from their pockets by any centrifugal force that would overcome the vacuum. At the next dwell position the plates P have reached the diagonal position and are still held by the vacuum. The ends E have nearly cleared the guide 46 and are still spaced a little distance from the guides 50. The leading edge S of the plates have entered a merge zone but have not yet made contact. As the wheel 32 advances the plates P into the merge zone, as shown in FIG. 8, the leading edges S make contact, the guide surfaces 52 lifts the plates out of their pockets and free of the vacuum and the plates come together in the mating plane. It is preferred that the guide surfaces 48 constrain the plates tightly enough that when they are released from guides 46 and are caught by guide surfaces 52, they snap together in the mating plane. To assure that a small misalignment does not cause one plate to swing through the mating plane and contact the other in a way to cause a large misalignment, the center guide 58 keeps each plate in its proper path. The tabs T on each plate overlap the edge S of the other plate in a position adjacent a tab on the other plate to help in the proper alignment as the plates come together and to help maintain the alignment subsequently. As the mating cycle ends and the next dwell begins, the plates are in the lower position shown in FIG. 4 and are dropping down the channel formed by surfaces 54 to the receiving fixture.

The embodiments of the invention in which an exclusive property or privilege is claimed are defined as follows:

1. In a process of forming heat exchanger tubes, the method of repetitively assembling separate pairs of elongated metal plates having side edges comprising the steps of:
   separating the plates into two groups,
   selecting a plate from each of the groups,
   positioning the two selected plates in spaced relation on opposite sides of a mating plane with their proximal edges parallel,
   holding the plates with a vacuum induced force while moving them simultaneously through respective arcs that are tangential to the mating plane so that the proximal edges touch at the mating plane, and
   continuing the arcuate movement of the plates and releasing the vacuum induced holding force while maintaining the proximal edges in the mating plane by restraining one plate with the other plate so as to cause the plates to snap together as an assembled pair.

2. In a process of forming heat exchanger tubes, the method of repetitively assembling separate pairs of elongated metal plates having ends and side edges comprising the steps of:
   separating the plates into two groups,
   selecting a plate from each of the groups,
   positioning the two selected plates in spaced relation on opposite sides of a vertical mating plane in planes transverse to the mating plane and with their proximal edges parallel,
   holding the plates with a vacuum induced force while moving them together simultaneously and guiding the plates in paths tangential to the mating plane by restraining the plate ends through arcs so that the proximal edges touch at the mating plane,
   continuing the arcuate movement of the plates and releasing the vacuum induced holding force while maintaining the proximal edges in the mating plane by restraining one plate with the other plate so as to cause the plates to snap together as an assembled pair, and
   guiding the pair of plates vertically to a fixture station.

* * * * *